June 1, 1943. H. B. HUTTEN 2,320,737
SOUND DAMPING INSULATION AND PROCESS OF MANUFACTURE
Filed June 22, 1939

INVENTOR
HENRY B. HUTTEN.
BY
ATTORNEY

Patented June 1, 1943

2,320,737

UNITED STATES PATENT OFFICE 2,320,737

SOUND DAMPING INSULATION AND PROCESS OF MANUFACTURE

Henry B. Hutten, Detroit, Mich., assignor to The Ruberoid Co., New York, N. Y., a corporation of New Jersey Application June 22, 1939, Serial No. 280,596

7 Claims. (Cl. 154—28)

This invention relates to the manufacture of a sound damping insulation material of an improved construction which results in a product having an exceptionally high degree of insulation against sound and vibration.

The product is particularly adapted for use in automobile body construction where the motor heat, sound and vibration must be effectively kept out of the passenger compartment.

It is known in the automotive industry that improved sound damping efficiency is obtained from the use of low density sheets made of loosely felted fibers.

However, when making insulating materials of loosely woven or matted fibers, and producing low density sheets, it is generally found that such products are expensive due to high cost of the materials used and slow and expensive manufacturing processes that are necessary. Also, such products, when finished, do not have the desired tensile strength, are likely to crack easily, when bent, and will not stand much handling.

It is also known that improved sound damping efficiency can be obtained with high density felted sheets by loosening the fibers. Furthermore, I am aware that it has been proposed to use for insulating purposes felted sheets having indentations and corresponding projections formed therein.

I have found that where a felted sheet is subjected to two or more indenting or flexing operations a marked improvement results in the sound damping properties of the material without impairing its tensile strength.

An object of this invention is to provide a double indented felt material of high sound damping insulation efficiency having a series of large waffle-like indentations and another series of small or fine indentations.

Another object of this invention is to provide an indented felt material of increased sound damping properties in which the fibers are loosened and the sheet is made less dense and more flexible by successive indenting operations that form sets of indentations in the sheet of different size and depth.

A further object of this invention is to provide an indented felt insulation material which is mechanically flexed in the process of production to loosen the fibers and thereby increase its sound damping efficiency.

The above and other objects and advantages of this invention will become apparent as the description proceeds, reference being had to the accompanying drawing wherein.

Figure 1:
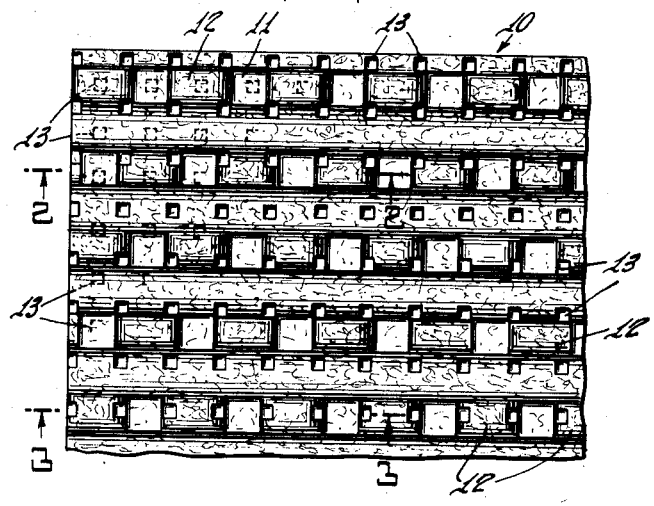
Figure 1 is a plan view of a portion of a sheet of insulating material of this invention.
Figure 2:
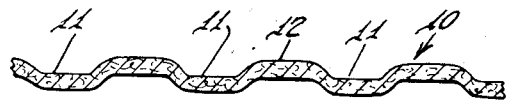
Fig. 2 is a sectional view taken on the line 2—2 of Figure 1.
Figure 3:
Fig. 3 is a section view taken on the line 3—3 of Figure 1.

The insulation felt indicated at 10 may be made on a paper machine and may be composed of any suitable fibers usual in the art, such as fibers used for making sheets of felt paper or other felted fibrous material which may or may not be saturated with asphalt, oil, bitumen, etc. Reclaimed felt fibers either saturated or unsaturated, or a mixture of such fibers in suitable proportions may be used in making the felt. If the felt is saturated with the bituminous substance, the indentations and projections may be formed in it either before or after saturation, preferably after the felt has been treated with the bituminous substance.

On both faces of the material are formed a series of relatively large indentations 11 and corresponding projections 12 in waffle-like formation. These may be formed in any known manner as by passing the material between suitable indenting rolls. An additional series of indentations 13, which are smaller and shallower than the indentations 11, are formed by another set of indenting rolls.

The relative positioning of the large and small indentations to each other does not appear to have any effect upon the insulating properties. The arrangement shown in the drawing is merely illustrative and is subject to variation.

The passage of the sheet successively through the two sets of indenting rolls, which may be combined in a single machine, causes a flexing of the felt material which tends to loosen and separate the fibers from each other thereby producing a material of high damping efficiency with no appreciable increase in the manufacturing cost.

It has been found in practice that if the material is run through the small indentation forming rolls first, and the large indentations are formed afterwards, a higher damping efficiency is obtained than if the indentations were applied in the reverse order.

By the above described plural indenting method of loosening and separating the fibers and layers of felt, a product results which has been found to have an improved sound damping efficiency of from five to ten times the original value.

Suitable flexing of the felt material and the resulting loosening and separating of the fibers and layers may be accomplished in other ways than by the successive passage between sets of small and large indenting rolls. For example, the felt prior or subsequent to its indentation may be rolled or flexed over a series of small diameter plan surfaced rolls which would result in a similar loosening and separating of the fibers and layers.

The double indented felt sheets may be used alone, or two or more of the sheets may be assembled on one another and secured together at intervals by stitching, stapling, riveting, or the application of adhesive in spots or lines, or one of the sheets of indented felt may be similarly secured to a flat sheet of unindented felt.

I do not wish to be limited to the exact design and arrangement of indentations as disclosed on the drawing, nor do I wish to be limited to the roll method described for producing the flexing of the felt sheet and the indentations therein. Any other suitable structure for producing the desired flexing and loosening of the fibers may be used.

What I claim is:

1. The method of increasing the sound damping qualities of a sheet of felted fibrous structure which comprises flexing the sheet, and imposing successive sets of indentations of different size and depth in the faces thereof to displace portions of the fibrous structure from their original planar position, and to increase the flexibility and sound damping efficiency of the sheet without diminishing its tensile strength.

2. The method of improving the sound damping properties of a sheet of matted fibrous structure which comprises imposing a set of indentations of one size and depth in a face thereof to displace portions of the structure from their original planar position, and superimposing a second set of indentations of a different size and depth in said face to impart additional displacement of portions of the fibrous structure in such a manner as to increase sheet flexibility without diminishing its tensile strength and to increase the sound damping efficiency attributable to the initial fibrous structure displacement.

3. The method of increasing the sound damping properties of a sheet of fibrous insulating felt which comprises imposing a plurality of indentations and projections in the faces of said sheet to displace portions thereof from their original planar position, and imposing additional indentations of a different size upon the initial indentations and projections to impart additional displacement of said sheet portions, increase the sheet flexibility without diminishing its tensile strength, and increase the sound damping efficiency attributable to the initial displacement.

4. The method of increasing the sound damping properties of a sheet of felted fibrous structure which comprises imposing a plurality of relatively small shallow indentations in at least one face thereof to displace portions of the fibrous structure from their original planar position, and imposing comparatively large projections and deeper indentations upon said initial indentations to impart additional displacement of said fibrous structure, increase the sheet flexibility without diminishing its tensile strength, and increase the sound damping efficiency attributable to the initial displacement.

5. The method of increasing the sound damping qualities of a sheet of fibrous insulating felt which comprises imposing a plurality of relative small shallow indentations in the faces thereof while said sheet is in flexed condition, whereby portions of the fibrous sheet are displaced from their original planar position, and imposing comparatively large waffle-like projections and corresponding deeper indentations upon said initial indentations to impart additional displacement of said fibrous sheet portions to increase the sheet flexibility without diminishing its tensile strength and to increase the sound damping efficiency attributable to the initial displacement.

6. A sound damping material comprising a sheet of fibrous structure having a plurality of initial indentations of one size and depth in the faces thereof, whereby portions of the fibrous structure are displaced from their initial planar position, and having a plurality of additional indentations of different size and depth imposed upon said initial indentations, whereby the flexibility of the sheet is increased without diminishing its tensile strength, and the sound damping efficiency attributable to the initial displacement is substantially increased.

7. A sound damping material comprising a sheet of fibrous structure having a plurality of relatively small, shallow indentations in the faces thereof, whereby portions of the fibrous structure are displaced from their initial planar position, and having a plurality of comparatively deep, waffle-like indentations and correspondingly large projections imposed upon said relatively small, shallow indentations, whereby the flexibility of the sheet is increased without diminishing its tensile strength, and the sound damping efficiency attributable to the initial displacement is substantially increased.

HENRY B. HUTTEN.